(12) United States Patent
Shimada et al.

(10) Patent No.: US 11,712,720 B2
(45) Date of Patent: Aug. 1, 2023

(54) MACHINE TOOL WIPER AND METHOD FOR MANUFACTURING MACHINE TOOL WIPER

(71) Applicant: NITTA CORPORATION, Osaka (JP)

(72) Inventors: Tomohisa Shimada, Yamatokoriyama (JP); Hirofumi Tsujimoto, Yamatokoriyama (JP)

(73) Assignee: NITTA CORPORATION, Osaka (JP)

( * ) Notice: Subject to any disclaimer, the term of this patent is extended or adjusted under 35 U.S.C. 154(b) by 591 days.

(21) Appl. No.: 16/645,626

(22) PCT Filed: Sep. 11, 2018

(86) PCT No.: PCT/JP2018/033684
§ 371 (c)(1),
(2) Date: Mar. 9, 2020

(87) PCT Pub. No.: WO2019/054384
PCT Pub. Date: Mar. 21, 2019

(65) Prior Publication Data
US 2020/0282433 A1 Sep. 10, 2020

(30) Foreign Application Priority Data
Sep. 12, 2017 (JP) .................................. 2017-174838

(51) Int. Cl.
*B29C 48/12* (2019.01)
*B08B 1/00* (2006.01)
(Continued)

(52) U.S. Cl.
CPC .............. *B08B 1/001* (2013.01); *B23Q 11/08* (2013.01); *B29C 48/12* (2019.02); *B29C 48/16* (2019.02); *B29K 2995/007* (2013.01)

(58) Field of Classification Search
CPC ...... B08B 1/001; B08B 1/005; B23Q 11/0875; B23Q 11/08; B29C 48/16; B29C 48/12;
(Continued)

(56) References Cited

U.S. PATENT DOCUMENTS 4,622,712 A 11/1986 Sugita et al.
5,334,458 A 8/1994 Powers et al.
(Continued)

FOREIGN PATENT DOCUMENTS

JP S60-81058 U 6/1985
JP S61-105257 A 5/1986
(Continued)

OTHER PUBLICATIONS

The extended European search report of the corresponding EP application No. 18857007.1 dated May 7, 2021.

*Primary Examiner* — Monica A Huson
(74) *Attorney, Agent, or Firm* — Muncy, Geissler, Olds & Lowe, P.C.

(57) ABSTRACT

Provided are a wiper for a machine tool and a method for manufacturing a wiper for a machine tool, which can simplify a manufacturing process. A wiper for a machine tool mountable on a machine tool includes: a wiper body fixable to the machine tool, and made of a first elastic material having hardness of 80 degrees or more; and a sliding part made of a second elastic material containing a particulate reinforcing material and having hardness in a range of 50 degrees or more and 90 degrees or less which is smaller than the hardness of the first elastic material, the sliding part being provided integrally with the wiper body, wherein the wiper body and the sliding part are integrally formed without an adhesive.

6 Claims, 5 Drawing Sheets

(51) Int. Cl.
*B29C 48/16* (2019.01)
*B23Q 11/08* (2006.01)

(58) Field of Classification Search
CPC ......... B29C 48/07; B29C 35/02; B29C 48/19; B29C 48/22; B29K 2995/007
See application file for complete search history.

(56) References Cited

U.S. PATENT DOCUMENTS

| | | |
|---|---|---|
| 2003/0233722 A1 | 12/2003 | Sawamura et al. |
| 2011/0081515 A1 | 4/2011 | Lay |
| 2016/0325316 A1 | 11/2016 | Shimada et al. |

FOREIGN PATENT DOCUMENTS

| | | |
|---|---|---|
| JP | 2005066376 A | 3/2005 |
| JP | 2007-083344 A | 4/2007 |
| JP | 2008-264776 A | 11/2008 |
| WO | 2015/099087 A1 | 7/2015 |

MACHINE TOOL WIPER AND METHOD FOR MANUFACTURING MACHINE TOOL WIPER

TECHNICAL FIELD

The present invention relates to a wiper for a machine tool and a method for manufacturing a wiper for a machine tool.

BACKGROUND ART

Conventionally, in order to prevent biting a foreign substance such as chips in a sliding surface of a machine tool such as a lathe and a milling machine, a wiper for a machine tool has been used (for example, Patent Literature 1). The wiper for a machine tool is mounted on a body part that reciprocates relative to the sliding surface such as a cover surface and a machine base surface of the machine tool. The wiper for a machine tool according to Patent Literature 1 described above includes a wiper body provided with a mounting member to be mounted on the machine tool, and a lip part formed on a lower end of the wiper body. The mounting member is mainly made of a metal plate. The wiper body and the lip part are each made of an elastic material. The mounting member on which an adhesive is applied is disposed in a die, and the die is filled with the elastic material, so that the wiper for a machine tool is integrally molded.

CITATION LIST

Patent Literature

Patent Literature 1: International Publication No. 2015/099087

SUMMARY OF INVENTION

Technical Problem

In a case of the above Patent Literature 1, there is a problem that the mounting member requires pretreatment work such as cutting of the metal plate, degreasing and strain elimination of the surface, burr polishing, and application of adhesive, and the number of manufacturing processes is increased.

An object of the present invention is to provide a wiper for a machine tool and a method for manufacturing a wiper for a machine tool, which can simplify a manufacturing process.

Solution to Problem

A wiper for a machine tool according to the present invention is a wiper for a machine tool mountable on a machine tool, the wiper for a machine tool including: a wiper body fixable to the machine tool, and made of a first elastic material having hardness of 80 degrees or more; and a sliding part made of a second elastic material containing a particulate reinforcing material and having hardness in a range of 50 degrees or more and 90 degrees or less which is smaller than the hardness of the first elastic material, the sliding part being provided integrally with the wiper body, wherein the wiper body and the sliding part are integrally formed without an adhesive.

A method for manufacturing a wiper for a machine tool according to the present invention is a method for manufacturing a wiper for a machine tool to be mounted on a machine tool, the wiper for a machine tool being obtained by integrally forming a wiper body and a sliding part without an adhesive, the wiper body being made of a first elastic material having hardness of 80 degrees or more, the sliding part being made of a second elastic material containing a particulate reinforcing material and having hardness in a range of 50 degrees or more and 90 degrees or less which is smaller than the hardness of the first elastic material, the method including: concurrently extruding the first elastic material and the second elastic material from openings of an extrusion die; and solidifying the first elastic material and the second elastic material extruded from the openings of the extrusion die.

Advantageous Effect of Invention

According to the present invention, it is possible to manufacture a wiper for a machine tool in which a wiper body made of a first elastic material and a sliding part made of a second elastic material are integrated by extrusion molding, and therefore a metal plate is not used unlike a conventional one, resulting in simplification of a manufacturing process.

BRIEF DESCRIPTION OF DRAWINGS

Each of FIGS. 4A and 4B is a side view illustrating a configuration of a wiper for a machine tool according to Modification (C), in which FIG. 4B illustrates Modification C2; and Each of FIGS. 5A, 5B, 5C and 5D is a side view illustrating a configuration of a wiper for a machine tool according to Modification (D), in which

DESCRIPTION OF EMBODIMENTS

Figure 1:
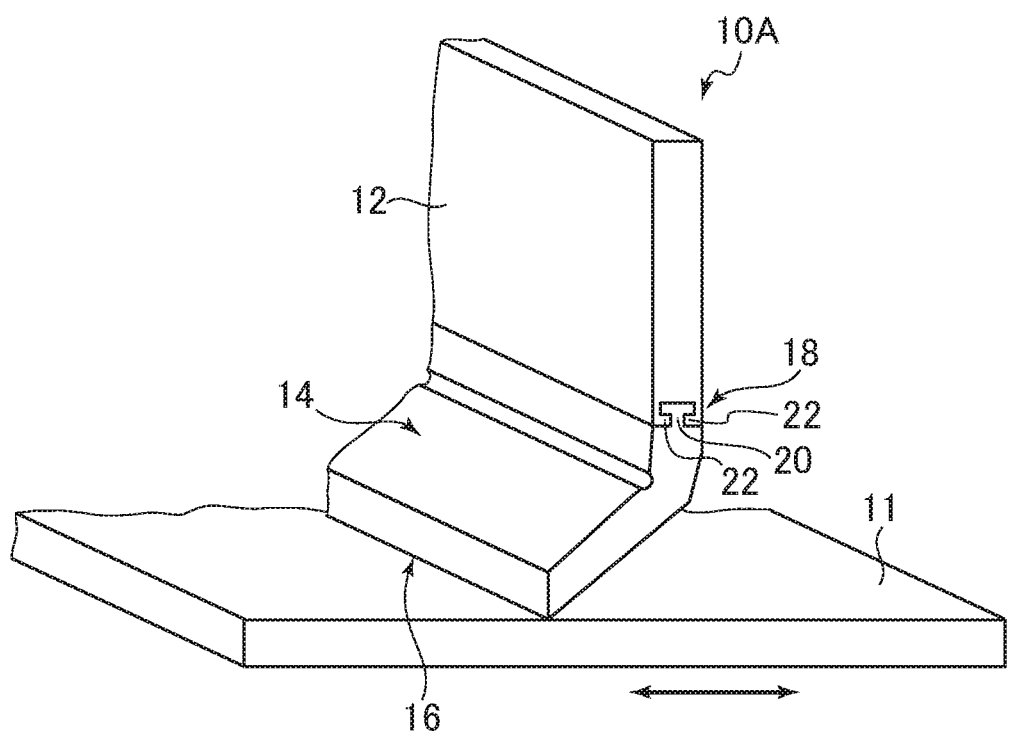
FIG. 1 is a perspective view illustrating a configuration of a wiper for a machine tool according to this embodiment.

Hereinafter, an embodiment of the present invention will be described in detail with reference to the drawings. A wiper for a machine tool 10A illustrated in FIG. 1 includes a wiper body 12, and a sliding part 14 provided integrally with the wiper body 12. In the wiper for a machine tool 10A, the wiper body 12 is mounted on a machine tool (not illustrated) so as to reciprocate relative to a scraping surface 11 such as a cover surface and a machine base surface of the machine tool (in the arrow direction in the drawing).

The wiper body 12 is a long plate-like member made of a first elastic material. As the first elastic material, hard resin or hard rubber having hardness of 80 degrees or more and 100 degrees or less can be used. The hardness of the first elastic material is preferably 85 degrees or more, more preferably 90 degrees or more. As the hard resin, for example, a resin material such as rigid polyvinyl chloride, ABS, PET can be used. As the hard rubber, for example, a rubber material such as NBR, urethane rubber, fluororubber, H-NBR, and carboxylated nitrile rubber (X-NBR) can be used. The resin or rubber material preferably has oil resistance, and has suitable elasticity in a range of hardness of 90 degrees or more. The hardness in this specification means Shore A hardness measured by a type A durometer on the basis of JIS K6253.

The sliding part 14 is a long plate-like member having the same length as the wiper body 12 made of a second elastic material, and is integrally fixed to one of long sides of the wiper body 12. The sliding part 14 may be formed so as to be inclined at a predetermined angle (for example, about 100° to 150°) with respect to the short direction of the wiper body 12.

As the second elastic material, soft resin or soft rubber having hardness of 50 degrees or more which is smaller than the hardness of the first elastic material can be used. The hardness of the second elastic material is preferably 55 degrees or more and 90 degrees or less, more preferably 60 degrees or more and 85 degrees or less. As the soft resin, for example, a resin material such as soft vinyl chloride and urethane can be used. As the soft rubber, for example, a rubber material such as NBR, urethane rubber, fluororubber, H-NBR, and carboxylated nitrile rubber (X-NBR) can be used. The rubber material preferably has oil resistance.

In the sliding part 14, a certain ratio of a material for reinforcement, and a solid lubricating resin material are added as the reinforcing material to the aforementioned elastic material. As the material for reinforcement, a particulate polyethylene resin particle material, a particulate silica particle material, a particulate silica-alumina particle material, or the like can be used. As the solid lubricating resin material, a particulate acrylic-modified silicone resin particle material, a particulate polytetrafluoroethylene resin particle material, a particulate nylon resin particle material, or the like can be used. When the addition amount of each of the material for reinforcement and the solid lubricating resin material is too small compared to the constant ratio, mixed distribution to the rubber material becomes uneven, and a seal performance maintaining effect of the wiper for a long period is sometimes reduced. Additionally, when the addition amount of each of the material for reinforcement and the solid lubricating resin material is too much compared to the constant ratio, extrusion molding becomes difficult.

The wiper body 12 and the sliding part 14 are integrated such that long sides abut on each other. A joining part 18 where the wiper body 12 and the sliding part 14 are in contact with each other has a joint structure in which joints 20, 22 protruding toward each other are formed. The wiper body 12 has the joint 22 that protrudes toward the sliding part 14, at one of the long sides. In this embodiment, the joint 22 of the wiper body 12 is forked with space at the center in the thickness direction, and a protrusion that protrudes in the thickness direction is formed at a leading end. The joint 20 of the sliding part 14 protrudes from a substantial center in the thickness direction, and is formed in a substantial T-shape. Thus, the joint structure is formed such that the joints 20, 22 engage with each other. The respective joints of the wiper body 12 and the sliding part 14 are integrated by vulcanized adhesion.

Now, a method for manufacturing the wiper for a machine tool 10A configured described above will be described. The wiper for a machine tool 10A is manufactured through respective processes of material preparation, extrusion, solidification, and cutting. First, a resin pellet material, and a material for reinforcement and a solid lubricating resin material, or an unvulcanized rubber material obtained by kneading raw rubber, and a mixed material obtained by adding a material for reinforcement and a solid lubricating resin material to the above rubber material are produced, so that an unvulcanized first elastic material and an unvulcanized second elastic material are prepared.

In a next process for extruding the unvulcanized first elastic material and second elastic material, an extrusion device (not illustrated) is used. An extrusion die (not illustrated) of the extrusion device is formed with a first mold cavity having substantially the same design shape as the wiper body 12, and a second mold cavity having substantially the same design shape as the sliding part 14, as openings. The extrusion device is configured such that the first elastic material and the second elastic material are individually supplied to the first mold cavity and the second mold cavity, respectively. The unvulcanized first elastic material and second elastic material are concurrently extruded from the extrusion die.

The unvulcanized first elastic material and second elastic material pass through the first mold cavity and the second mold cavity of the extrusion die to be extruded from the extrusion die in a state in which the wiper body 12 portion and the sliding part 14 portion are integrated in the joining part 18.

Then, the extruded unvulcanized first elastic material and second elastic material are continuously guided into a vulcanization device (not illustrated), and solidified in the vulcanization device. Thereafter, cutting into a predetermined length is performed, so that the wiper for a machine tool 10A is obtained.

The wiper for a machine tool 10A configured as described above is mounted on a body part (not illustrated) of the machine tool in a state in which a leading end 16 is in contact with the scraping surface 11. When the body part moves in the arrow direction in the drawing (thickness direction of the wiper body), the wiper for a machine tool 10A removes a foreign substance on the scraping surface 11.

In the aforementioned embodiment, it is possible to manufacture the wiper for a machine tool 10A in which the wiper body 12 made of the first elastic material, and the sliding part 14 made of the second elastic material are integrated by the extrusion molding, and therefore it is possible to eliminate a metal plate conventionally used, resulting in simplification of the manufacturing process.

In the aforementioned manufacturing method, the unvulcanized first elastic material and second elastic material are extruded from the die in a state in which the wiper body 12 portion and the sliding part 14 portion are integrated in the joining part 18, and thereafter the first elastic material and the second elastic material are solidified by vulcanization, so that the wiper for a machine tool 10A is obtained. The wiper for a machine tool 10A is thus manufactured, and therefore it is possible to improve precision of the joining part 18 of the wiper body 12 and the sliding part 14, and reduce dispersion of pressing force and sliding friction.

In the wiper for a machine tool 10A, it is possible to integrate the wiper body 12 and the sliding part 14 without an adhesive in the joining part 18, and therefore it is possible to eliminate a process for bonding the wiper body 12 and the sliding part 14.

In the wiper for a machine tool 10A, the joining part 18 has the joint structure, so that it is possible to improve joining strength of the wiper body 12 and the sliding part 14. In this embodiment, in the joining part 18, the respective joints formed in the wiper body 12 and the sliding part 14 engage with each other, so that it is possible to further improve the joining strength.

In the wiper for a machine tool 10A, the material for reinforcement and the solid lubricating resin material are added to the leading end portion, so that a coefficient of friction with the scraping surface 11 is reduced, and it is possible to obtain excellent sliding performance and durability performance also in environment in which cutting fluid is not used.

A wiper for a machine tool 10A having a different standard length can be easily manufactured without manufacturing a new member having a different standard by changing the cutting length in the cutting process of the wiper body 12 and the sliding part 14.

(Modification)

The present invention is not limited to the aforementioned embodiment, and can be appropriately changed within the spirit of the present invention.

Although the case where the sliding part 14 is formed so as to be inclined at the predetermined angle (for example, about 100° to 150°) with respect to the short direction of the wiper body 12 is described in the aforementioned embodiment, the present invention is not limited to this. That is, the wiper for a machine tool may be formed such that the wiper body and the sliding part are joined on the same plane.

Although the case where the sliding part 14 is made of the second elastic material obtained by adding the material for reinforcement and the solid lubricating resin material is described in the aforementioned embodiment, the present invention is not limited to this. Only a leading end portion including a leading end of a long side may be made of a second elastic material in which the material for reinforcement and the solid lubricating resin material are added. In this case, in the second mold cavity, the sliding part is formed by supplying a second elastic material including a soft resin material or a rubber material, a material for reinforcement and a solid lubricating resin material to the leading end portion, and supplying a second elastic material made of only a soft resin material or a rubber material not including any material for reinforcement and solid lubricating resin material to other portion except the leading end portion.

Figure 2:
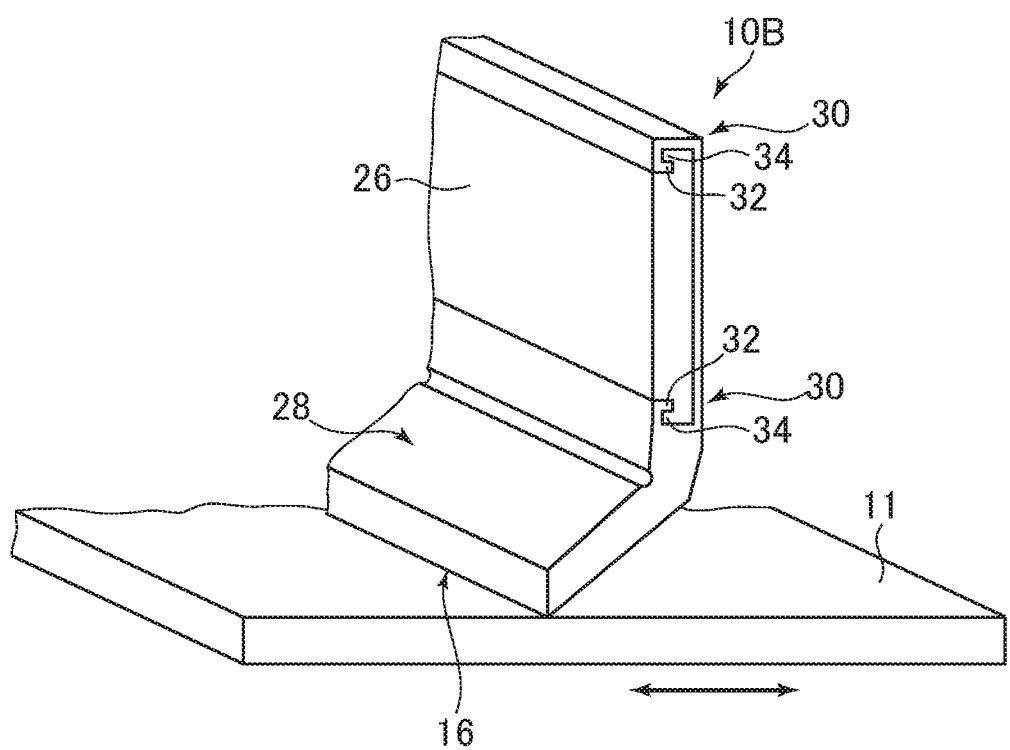
FIG. 2 is a perspective view illustrating a configuration of a wiper for a machine tool according to Modification (A)

Although the case where the wiper body 12 and the sliding part 14 are integrated such that the long sides abut on each other is described in the aforementioned embodiment, the present invention is not limited to this. As described in FIG. 2, a sliding part 28 may be provided with respective joining parts 30 at one of long sides of a wiper body 26 and the other long side of the wiper body 26 so as to cover a side surface of the wiper body 26. As illustrated in this figure, the wiper body 26 and the sliding part 28 have a joint structure in which joints 32, 34 protruding toward each other are formed in each of the joining parts 30. Protrusions protruding in the thickness direction are formed in leading ends, so that the joints 32, 34 engage with each other. A wiper for a machine tool 10B according to this modification can be manufactured by extrusion molding, and further has the joint structure, and therefore it is possible to obtain an effect similar to the effect of the aforementioned embodiment.

Figure 3:
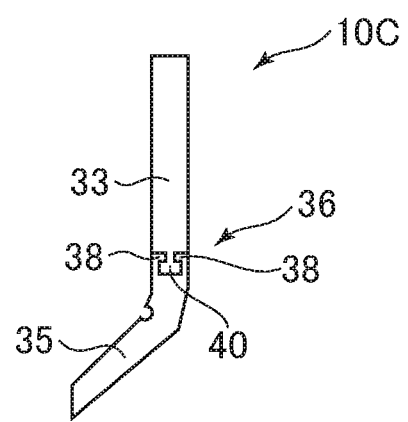
FIG. 3 is a side view illustrating a configuration of a wiper for a machine tool according to Modification (B)
Figure 4A:
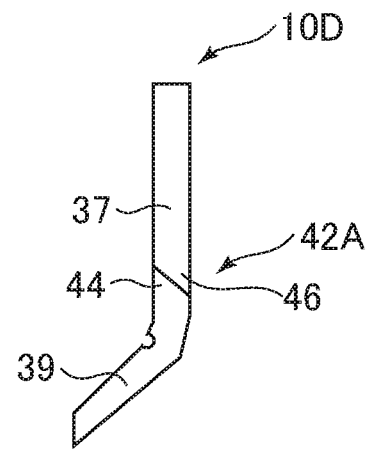
FIG. 4A illustrates Modification C1.
Figure 4B:
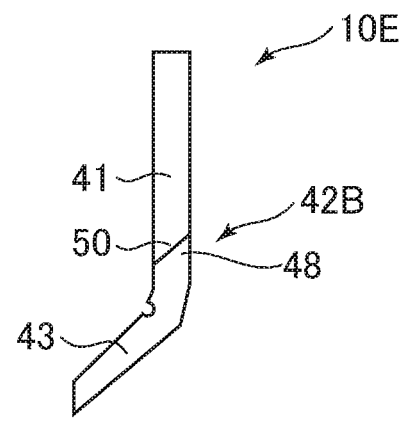

Like a wiper for a machine tool 10C illustrated in FIG. 3, a joining part 36 may have a configuration inversed to the aforementioned embodiment. That is, a joint 40 of a wiper body 33 protrudes from the center in the thickness direction, and is formed in a reversed T-shape. A joint 38 of a sliding part 35 is forked with space at the center in the thickness direction, and a protrusion that protrudes in the thickness direction is formed at a leading end. Thus, the joining part 36 is formed such that the joint 38 and the joint 40 engage with each other. The wiper for a machine tool 10C according to this modification can be manufactured by extrusion molding, and the joining part 36 further has a joint structure, and therefore it is possible to obtain an effect similar to the effect of the aforementioned embodiment.

Furthermore, modifications of the joint structure will be described with reference to FIGS. 4A, 4B and FIGS. 5A to 5D. In a wiper for a machine tool 10D illustrated in FIG. 4A, a joint 46 of a wiper body 37 protrudes and inclines from one end to the other end in the thickness direction. A joint 44 of a sliding part 39 inclines from one end toward the other end in the thickness direction in the opposite direction to the joint 46 of the wiper body 37. Thus, a joining part 42A is formed such that respective inclined surfaces of the joints 44, 46 abut on each other. In a wiper for a machine tool 10E illustrated in FIG. 4B, an inclined surface of a joining part 42B is formed in the opposite direction to the wiper for a machine tool 10D of FIG. 4A.

In each of the wipers for a machine tool illustrated in FIG. 5A to FIG. 5D, a joint of a wiper body has a protrusion protruding from the center in the thickness direction, a joint of a sliding part has two protrusions, and is formed with a groove recessed at the center in the thickness direction, and the protrusion and the groove are combined to form a joining part.

Figure 5A:
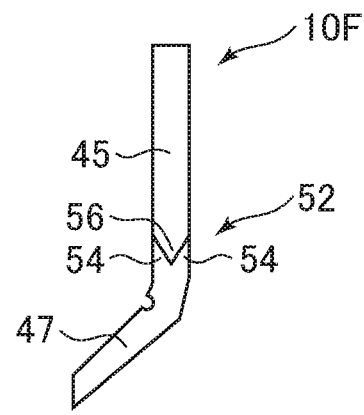
FIG. 5A illustrates Modification D1.

In a wiper for a machine tool 10F illustrated in FIG. 5A, a joining part 52 of a wiper body 45 and a sliding part 47 has a substantially V-shape. That is, a joint 56 of the wiper body 45 has a V-shaped protrusion. A joint 54 of the sliding part 47 has two protrusions, and has a V-shaped groove.

Figure 5B:
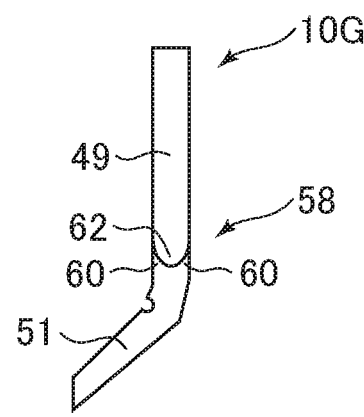
FIG. 5B illustrates Modification D2.

In a wiper for a machine tool 10G illustrated in FIG. 5B, a joining part 58 of a wiper body 49 and a sliding part 51 has a substantially U-shape. That is, a joint 62 of the wiper body 49 has a U-shaped protrusion. A joint 60 of the sliding part 51 has two protrusions, and has a U-shaped groove.

Figure 5C:
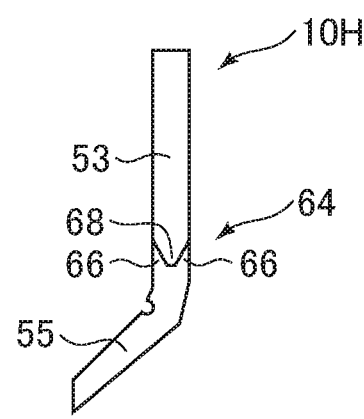
FIG. 5C illustrates Modification D3.

In a wiper for a machine tool 10H illustrated in FIG. 5C, a joining part 64 of a wiper body 53 and a sliding part 55 has a substantially V-shape with a bottom part. That is, a joint 68 of the wiper body 53 has a protrusion formed in the substantially V-shape with the bottom part. A joint 66 of the sliding part 55 has two protrusions, and has a groove in the substantially V-shape with the bottom part.

Figure 5D:
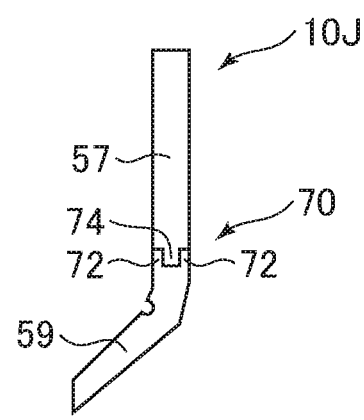
FIG. 5D illustrates Modification D4.

In a wiper for a machine tool 10J illustrated in FIG. 5D, a joining part 70 of a wiper body 57 and a sliding part 59 has a channel shape. That is, a joint 74 of the wiper body 57 has a channel-shaped protrusion. A joint 72 of the sliding part 59 has two protrusions, and has a channel-shaped groove.

The wipers for a machine tool 10D to 10H, 10J illustrated in FIGS. 4A, 4B and FIGS. 5A to 5D can be manufactured by extrusion molding, and furthermore, the joining parts 52, 58, 64, 70 have the respective joint structures, and therefore it is possible to obtain effects similar to the effect of the aforementioned embodiment.

REFERENCE SIGNS LIST 10A to 10H, 10J wiper for a machine tool
12, 26, 33, 37, 41, 45, 49, 53, 57 wiper body
14, 28, 35, 39, 43, 47, 51, 55, 59 sliding part
18, 30, 36, 42A, 42B, 52, 58, 64, 70 joining part
20, 22, 32, 34, 38, 40, 44, 46, 48, 50, 54, 56, 60, 62, 66, 68, 72, 74 joint

The invention claimed is:

1. A wiper for a machine tool mountable on a machine tool, the wiper for a machine tool comprising:
   a wiper body fixable to the machine tool, and made of a first elastic material having hardness of 80 degrees or more; and
   a sliding part made of a second elastic material containing a particulate reinforcing material and having predetermined hardness, the sliding part being provided integrally with the wiper body, wherein when the hardness of the first elastic material is larger than 90 degrees, the hardness of the second elastic material is ranged from 50 degrees to 90 degrees, when the hardness of the first elastic material is ranged from 80 degrees to 90 degrees, the hardness of the second elastic material is equal to or larger than 50 degrees and less than the hardness of the first elastic material, and the wiper body and the sliding part are integrally formed without an adhesive.

2. The wiper for a machine tool according to claim 1, wherein a joining part where the wiper body and the sliding part are in contact with each other comprises a joint structure in which joints protruding toward each other are formed.

3. The wiper for a machine tool according to claim 2, wherein the joints engage with each other.

4. A method for manufacturing a wiper for a machine tool mountable on a machine tool, the wiper for a machine tool being obtained by integrally forming a wiper body and a sliding part without an adhesive, the wiper body being made of a first elastic material having hardness of 80 degrees or more, the sliding part being made of a second elastic material containing a particulate reinforcing material and having predetermined hardness wherein when the hardness of the first elastic material is larger than 90 degrees, the hardness of the second elastic material is ranged from 50 degrees to 90 degrees, and when the hardness of the first elastic material is ranged from 80 degrees to 90 degrees, the hardness of the second elastic material is equal to or larger than 50 degrees and less than the hardness of the first elastic material, the method comprising:

concurrently extruding the first elastic material and the second elastic material from openings of an extrusion die; and solidifying the first elastic material and the second elastic material extruded from the openings of the extrusion die.

5. The method for manufacturing a wiper for a machine tool according to claim 4, wherein in the step of concurrently extruding the first elastic material and the second elastic material, a joint structure comprising joints protruding toward each other is formed in a portion where the wiper body and the sliding part are in contact with each other.

6. The method for manufacturing a wiper for a machine tool according to claim 5, wherein the joints engage with each other.

* * * * *